(12) United States Patent
Huang

(10) Patent No.: US 7,032,786 B1
(45) Date of Patent: Apr. 25, 2006

(54) CAULKING GUN HAVING ANGLE ADJUSTMENT FUNCTION

(75) Inventor: Chi-Chuan Huang, Changhua Hsien (TW)

(73) Assignee: Kai Shyun Enterprise Co., Ltd., Fuhsing Hsiang (TW)

( * ) Notice: Subject to any disclaimer, the term of this patent is extended or adjusted under 35 U.S.C. 154(b) by 0 days.

(21) Appl. No.: 10/968,515

(22) Filed: Oct. 19, 2004

(51) Int. Cl.
*B67D 5/42* (2006.01)
*G01F 11/00* (2006.01)

(52) U.S. Cl. .................... 222/391; 222/145.1; 222/160; 74/169; 74/141.5; 74/148; 74/531; 609/209; 254/106

(58) Field of Classification Search ............... 222/391, 222/145.4, 160; 74/169, 148, 141.5, 155, 74/128, 126, 129, 111, 531; 604/209
See application file for complete search history.

(56) References Cited

U.S. PATENT DOCUMENTS

| 1,850,965 A * | 3/1932 | Butler ................. 222/391 |
| 2,180,978 A * | 11/1939 | Crewe ................. 74/169 |
| 2,305,238 A * | 12/1942 | Coates ................. 74/169 |
| 2,367,346 A * | 1/1945 | Good ................. 74/169 |
| 4,171,072 A * | 10/1979 | Davis, Jr. ............. 222/326 |
| 4,509,662 A * | 4/1985 | Weiss ................. 222/391 |
| 2004/0124215 A1* | 7/2004 | Mayer ................. 222/391 |
| 2004/0195271 A1* | 10/2004 | Chen ................. 222/380 |

* cited by examiner

*Primary Examiner*—Michael Mar
*Assistant Examiner*—Stephanie E. Tyler
(74) *Attorney, Agent, or Firm*—Alan D. Kamrath; Nikolai & Mersereau, P.A.

(57) ABSTRACT

A caulking gun includes a gun body, a push rod, a push plate, an adjusting seat, a driving member, and an elastic member. Thus, the adjusting seat is movable in the gun body by rotation of the driving member to adjust the incline angle of the push plate by guidance of the tapered urging face of the adjusting seat so as to increase the incline angle of the locking hole of the push plate, so that the locking hole is locked on the push rod in a tilt manner so as to lock and move the push rod, without having to replace the push plate, thereby enhancing the lifetime of the caulking gun.

20 Claims, 7 Drawing Sheets

US 7,032,786 B1

CAULKING GUN HAVING ANGLE ADJUSTMENT FUNCTION

BACKGROUND OF THE INVENTION

1. Field of the Invention

The present invention relates to a caulking gun, and more particularly to a caulking gun having an angle adjustment function.

2. Description of the Related Art

A conventional caulking gun in accordance with the prior art shown in FIGS. 7 and 8 comprises a gun body 70 having a first end formed with a mounting hole 73 and a second end formed with a handle 71, a push rod 80 movably mounted on the gun body 70 and extended through the mounting hole 73 of the gun body 70, a push plate 91 mounted on the push rod 80 in an inclined manner and having a first end formed with a locking hole 92 rested on the push rod 80, an elastic member 90 mounted on the push rod 80 and biased between the gun body 70 and the push plate 91, a trigger 72 pivotally mounted on the gun body 70 and having an end rested on a second end 93 of the push plate 91 to push the push plate 91 to move, a barrel 74 mounted on a side of the gun body 70 and having an inside formed with a receiving chamber, a pull knob 81 mounted on a first end of the push rod 80, a catch plate (not shown) mounted on a second end of the push rod 80 and movably mounted in the receiving chamber of the barrel 74, and a cartridge (not shown) containing silicone received in the receiving chamber of the barrel 74 and rested on the catch plate.

In operation, when the trigger 72 is pressed, the end of the trigger 72 is urged on the second end 93 of the push plate 91 to push the push plate 91 to move forward in an inclined manner. Thus, the locking hole 92 of the push plate 91 is locked on the push rod 80 in a tilt manner to move the push rod 80 which moves the catch plate to compress the cartridge. After the trigger 72 is released, the push plate 91 is pushed by the restoring force of the elastic member 90 to move backward in a horizontal manner without moving the push rod 80. Thus, the push rod 80 and the catch plate are moved forward successively by pressing the trigger 72 repeatedly to compress the cartridge so as to squeeze the silicone outward from the cartridge for use.

However, when the locking hole 92 of the push plate 90 is worn out during a long-term utilization, the diameter of the locking hole 92 of the push plate 90 is enlarged to form a worn portion 94, so that the locking hole 92 of the push plate 91 cannot lock the push rod 80 to move the push rod 80. Thus, the conventional caulking gun cannot be used when the locking hole 92 of the push plate 91 is worn out, thereby decreasing the lifetime of the conventional caulking gun.

SUMMARY OF THE INVENTION

In accordance with the present invention, there is provided a caulking gun, comprising:
a gun body;
a push rod extended through and movably mounted on the gun body;
a push plate mounted on the push rod in an inclined manner to push the push rod to move and having a first end formed with a locking hole rested on the push rod;
an adjusting seat movably mounted in the gun body and having a side formed with a tapered urging face rested on a first side of the first end of the push plate;
a driving member rotatably mounted on the gun body and connected to the adjusting seat for moving the adjusting seat in the gun body;
an elastic member mounted on the push rod and biased between the gun body and a second side of the first end of the push plate.

The primary objective of the present invention is to provide a caulking gun having an angle adjustment function.

Another objective of the present invention is to provide a caulking gun, wherein the adjusting seat is movable in the gun body by rotation of the driving member to adjust the incline angle of the push plate by guidance of the tapered urging face of the adjusting seat so as to increase the incline angle of the locking hole of the push plate, so that the locking hole of the push plate is locked on the push rod in a tilt manner so as to lock and move the push rod, without having to replace the push plate, thereby enhancing the lifetime of the caulking gun.

A further objective of the present invention is to provide a caulking gun, wherein the driving member is rotated forward and backward on the gun body so as to adjust the output rate of the silicone from the cartridge.

A further objective of the present invention is to provide a caulking gun, wherein the driving member is located outside of the upper portion of the gun body, thereby facilitating a user rotating the driving member to move the adjusting seat so as to adjust the incline angle of the push plate.

Further benefits and advantages of the present invention will become apparent after a careful reading of the detailed description with appropriate reference to the accompanying drawings.

DETAILED DESCRIPTION OF THE INVENTION

Figure 1:
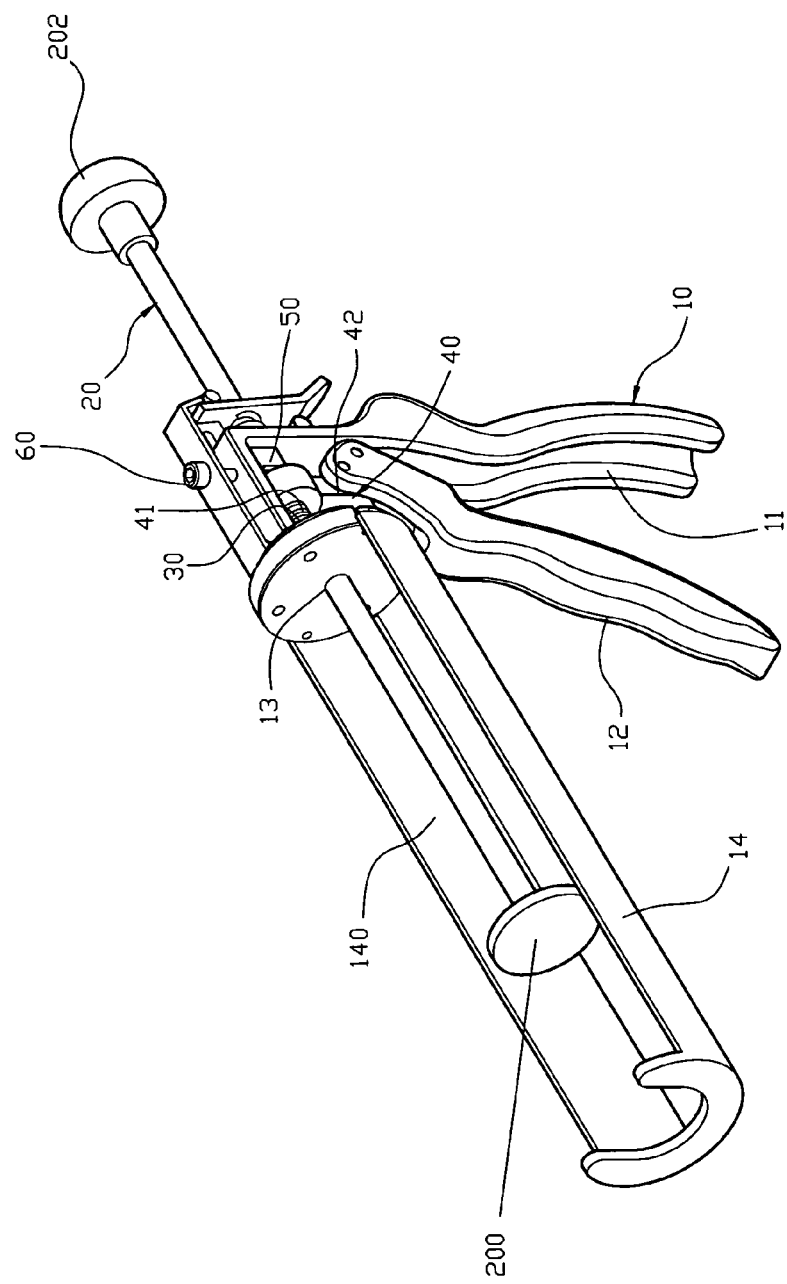
FIG. 1 is a perspective view of a caulking gun in accordance with the preferred embodiment of the present invention.
Figure 2:
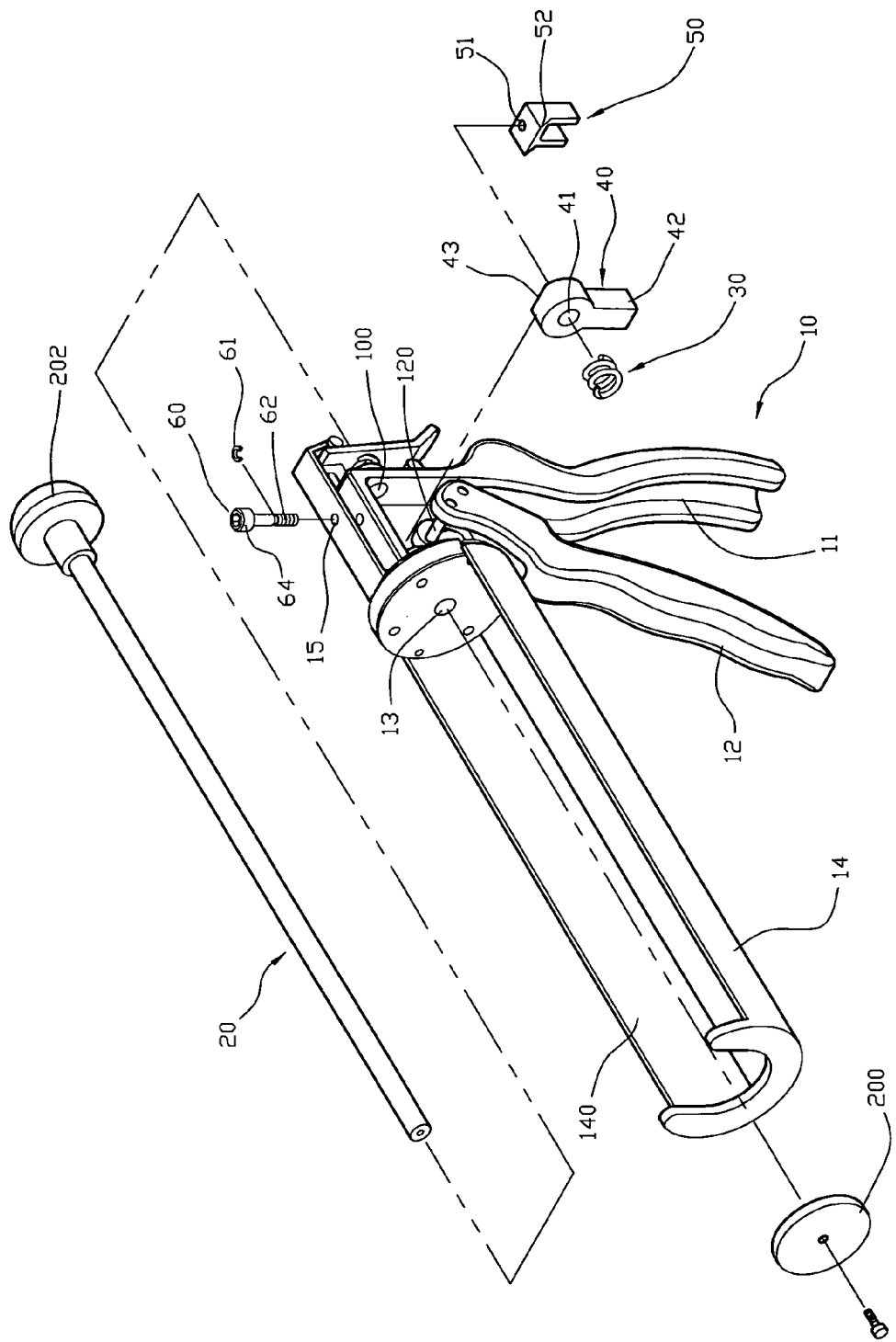
FIG. 2 is an exploded perspective view of the caulking gun as shown in FIG. 1.
Figure 3:
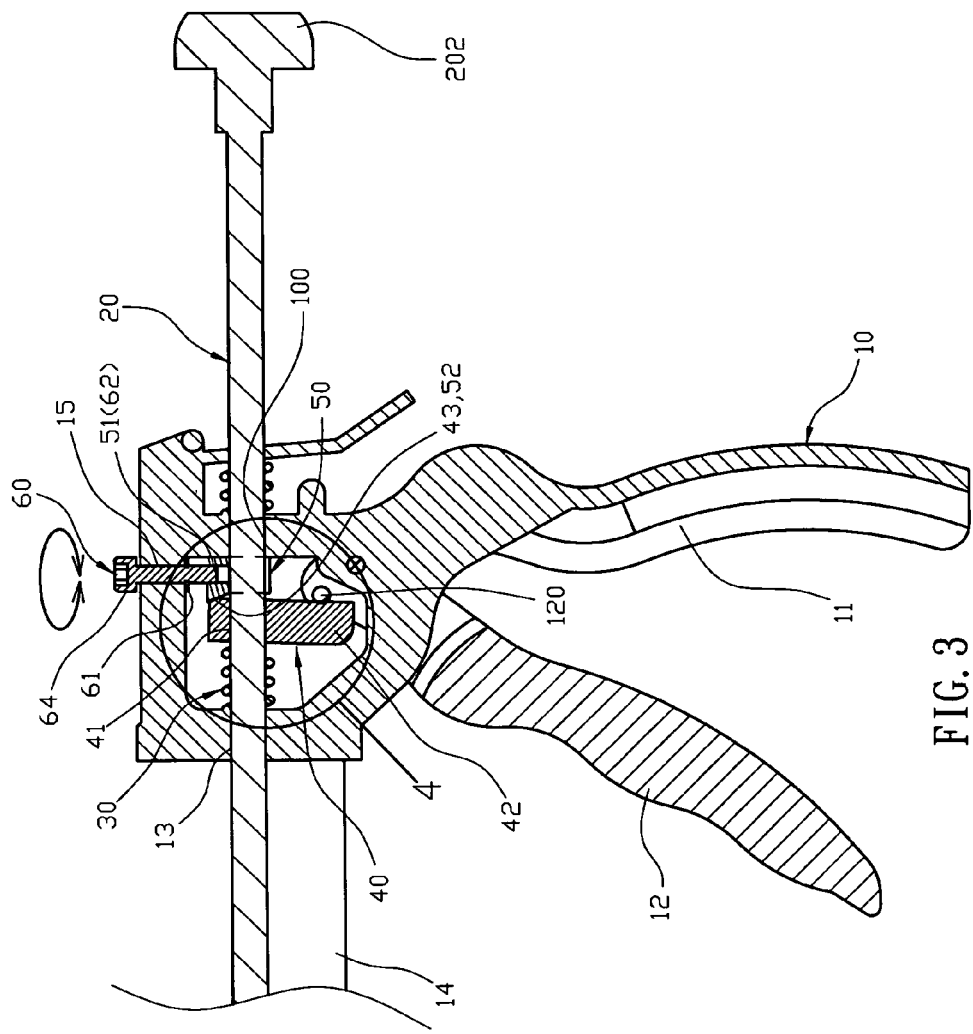
FIG. 3 is a partially cut-away plan cross-sectional view of the caulking gun as shown in FIG. 1.

Referring to the drawings and initially to FIGS. 1–4, a caulking gun in accordance with the preferred embodiment of the present invention comprises a gun body 10, a push rod 20 extended through and movably mounted on the gun body 10, a push plate 40 mounted on the push rod 20 in an inclined manner to push the push rod 20 to move and having a first end formed with a locking hole 41 rested on the push rod 20, an adjusting seat 50 movably mounted in the gun body 10 and having a side formed with a tapered urging face 52 rested on a first side of the first end of the push plate 40, a driving member 60 rotatably mounted on the gun body 10 and connected to the adjusting seat 50 for moving the adjusting seat 50 in the gun body 10, an elastic member 30 mounted on the push rod 20 and biased between the gun body 10 and a second side of the first end of the push plate 40, and a trigger 12 pivotally mounted on the gun body 10 and having an end provided with a push lever 120 rested on a second end of the push plate 40 to push the push plate 40 to move toward the elastic member 30.

The gun body 10 has a first side formed with a mounting hole 100 to allow passage of the push rod 20 and has an end formed with a handle 11. A barrel 14 is mounted on a second side of the gun body 10 and has an inside formed with a receiving chamber 140. The barrel 14 has an end formed with a through hole 13 to allow passage of the push rod 20.

The push rod 20 has a first end provided with a pull knob 202 protruding outward from the gun body 10. A catch plate 200 is mounted on a second end of the push rod 20 and movably mounted in the receiving chamber 140 of the barrel 14.

The first side of the first end of the push plate 40 is formed with a tapered guide portion 43 rested on the urging face 52 of the adjusting seat 50. Preferably, the guide portion 43 of the push plate 40 is an inclined face or a chamfered face. The locking hole 41 of the push plate 40 has a circular shape and has a diameter greater than that of the push rod 20. The second end of the push plate 40 is formed with a resting portion 42 rested on the push lever 120 of the trigger 12.

The adjusting seat 50 is substantially U-shaped and has an upper portion formed with a screw bore 51.

The driving member 60 is extended through the gun body 10 and has a first end formed with a threaded rod screwed into the screw bore 51 of the adjusting seat 50 and a second end formed with an enlarged head 64 protruding outward from the gun body 10. The gun body 10 has an upper portion formed with a through hole 15 to allow passage of the driving member 60. Preferably, the driving member 60 is an adjusting bolt.

When the driving member 60 is rotated on the gun body 10, the adjusting seat 50 is limited by an inner wall of the gun body 10 and the push plate 40, so that the adjusting seat 50 cannot be rotated by the driving member 60. Thus, the adjusting seat 50 is movable upward and downward in the gun body 10 by rotation of the driving member 60.

A retaining member 61 is secured in the gun body 10 and snapped onto the driving member 60 to prevent the driving member 60 from detaching from the gun body 10. Preferably, the retaining member 61 is a C-shaped snap ring and is snapped onto a mediate portion of the driving member 60.

In operation, referring to FIGS. 1–4, a cartridge (not shown) containing silicone is received in the receiving chamber 140 of the barrel 14 and rested on the catch plate 200. When the trigger 12 is pressed, the push lever 120 of the trigger 12 is urged on the resting portion 42 of the push plate 40 to push the push plate 40 to move forward in an inclined manner. Thus, the locking hole 41 of the push plate 40 is locked on the push rod 20 in a tilt manner to move the push rod 20 which moves the catch plate 200 forward to compress the cartridge. After the trigger 12 is released, the push plate 40 is pushed by the restoring force of the elastic member 30 to move backward in a horizontal manner without moving the push rod 20. Thus, the push rod 20 and the catch plate 200 are moved forward successively by pressing the trigger 12 repeatedly to compress the cartridge so as to squeeze the silicone outward from the cartridge for use.

Figure 6:
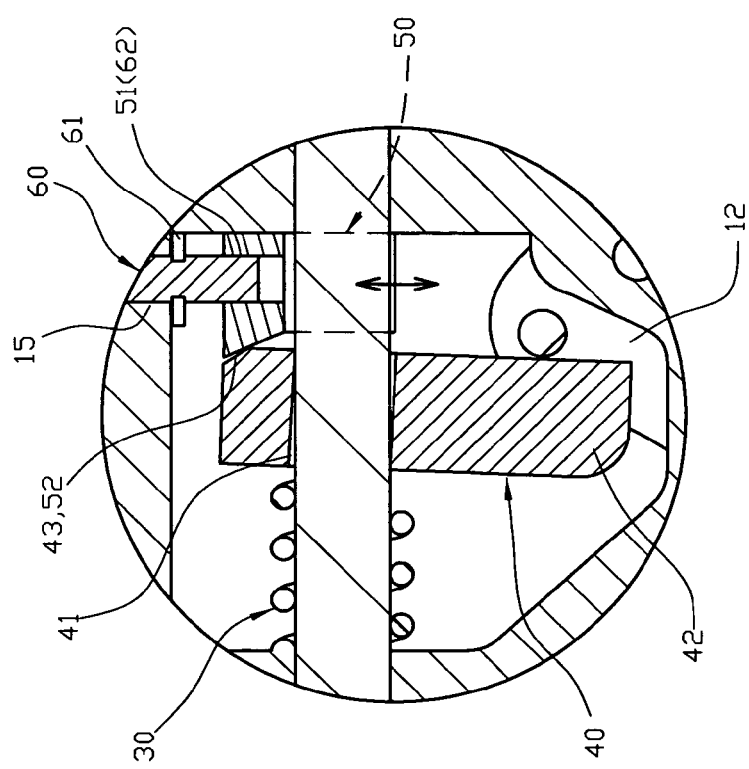
FIG. 6 is a locally enlarged view of the caulking gun taken along the circle 6 as shown in FIG. 5.
Figure 5:
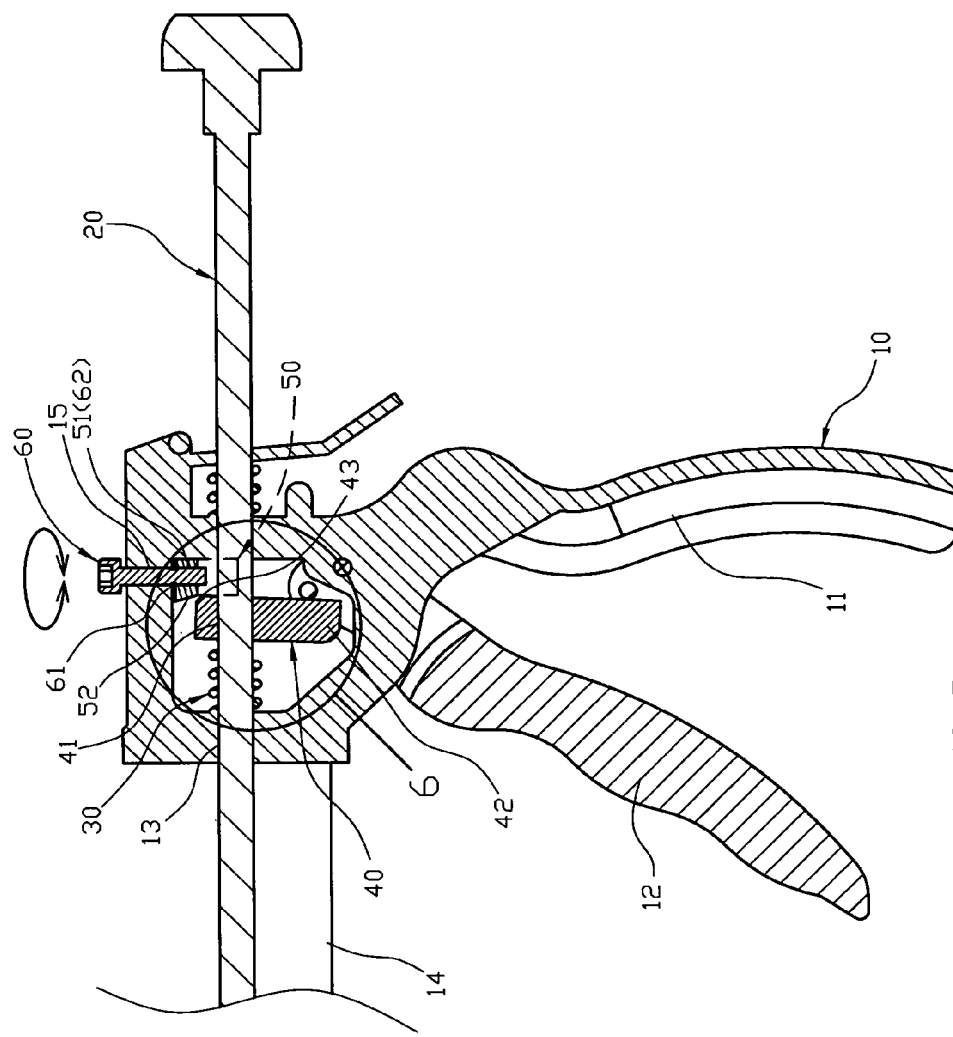
FIG. 5 is a partially cut-away plan cross-sectional view of the caulking gun as shown in FIG. 1.
Figure 7:
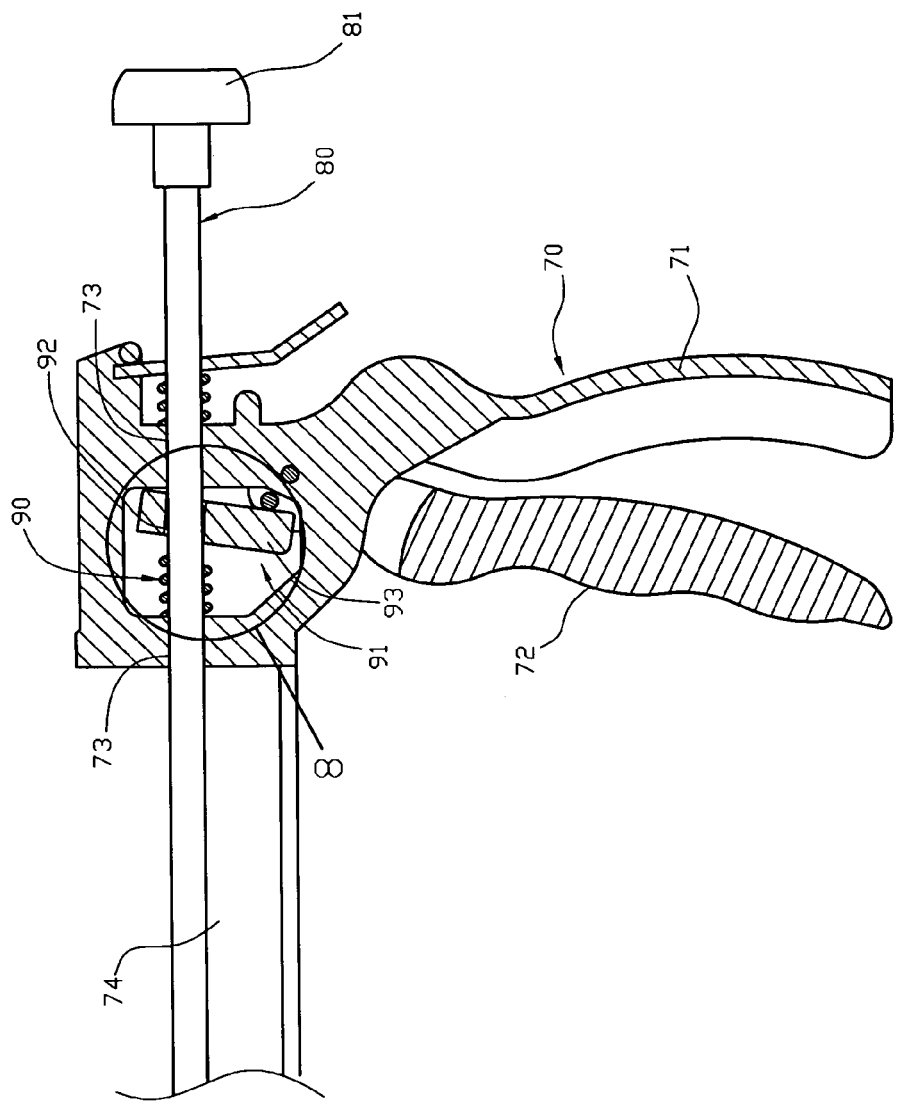
FIG. 7 is a partially cut-away plan cross-sectional view of a conventional caulking gun in accordance with the prior art.
Figure 8:
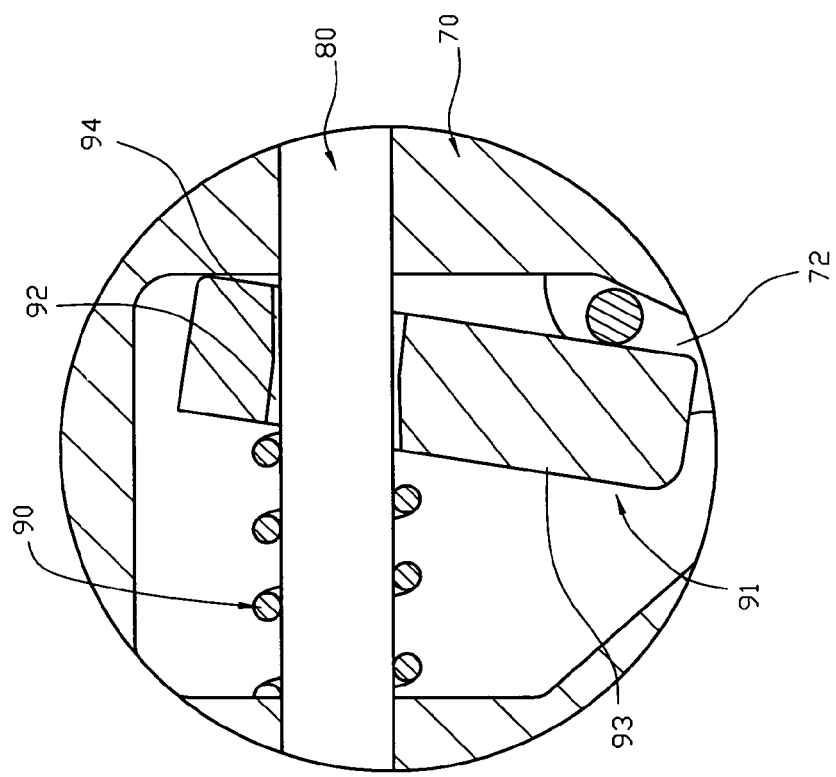
FIG. 8 is a locally enlarged view of the conventional caulking gun taken along the circle 8 as shown in FIG. 7.

Alternatively, referring to FIGS. 5 and 6, when the locking hole 41 of the push plate 40 is worn out during a long-term utilization, the diameter of the locking hole 41 of the push plate 40 is enlarged, so that the locking hole 41 of the push plate 40 cannot lock the push rod 20 to move the push rod 20 any more. At this time, the driving member 60 is rotated on the gun body 10 to drive the adjusting seat 50 to move upward in the gun body 10.

Figure 4:
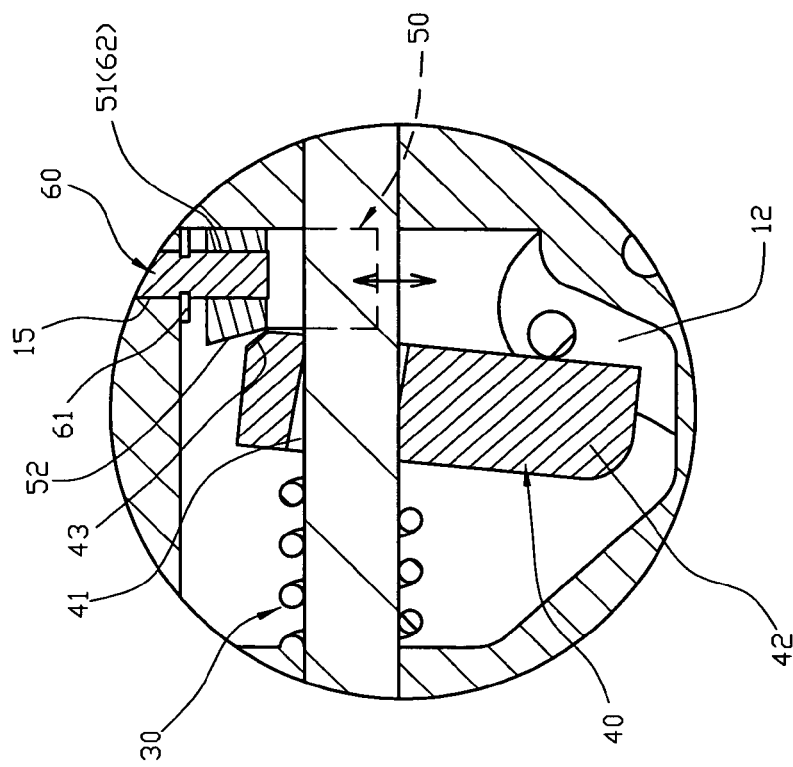
FIG. 4 is a locally enlarged view of the caulking gun taken along the circle 4 as shown in FIG. 3.

In such a manner, the tapered urging face 52 of the adjusting seat 50 is moved upward relative to the tapered guide portion 43 of the push plate 40 to displace from the position as shown in FIG. 4 to the position as shown in FIG. 6 to release the tapered guide portion 43 of the push plate 40 from the tapered urging face 52 of the adjusting seat 50 to adjust and increase the incline angle of the push plate 40 so as to increase the incline angle of the locking hole 41 of the push plate 40, so that the locking hole 41 of the push plate 40 is locked on the push rod 20 in a tilt manner again so as to lock and move the push rod 20.

In addition, the driving member 60 is rotated backward on the gun body 10 to increase the forward stroke of the push plate 40 so as increase the output rate of the silicone from the cartridge. Alternatively, the driving member 60 is rotated forward on the gun body 10 to decrease the forward stroke of the push plate 40 so as decrease the output rate of the silicone from the cartridge.

Accordingly, the adjusting seat 50 is movable in the gun body 10 by rotation of the driving member 60 to adjust the incline angle of the push plate 40 by guidance of the tapered urging face 52 of the adjusting seat 50 so as to increase the incline angle of the locking hole 41 of the push plate 40, so that the locking hole 41 of the push plate 40 is locked on the push rod 20 in a tilt manner so as to lock and move the push rod 20, without having to replace the push plate 40, thereby enhancing the lifetime of the caulking gun. In addition, the driving member 60 is rotated forward and backward on the gun body 10 so as to adjust the output rate of the silicone from the cartridge. Further, the driving member 60 is located outside of the upper portion of the gun body 10, thereby facilitating a user rotating the driving member 60 to move the adjusting seat 50 so as to adjust the incline angle of the push plate 40.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A caulking gun, comprising:

a gun body;

a push rod extended through and movably mounted on the gun body;

a push plate mounted on the push rod in an inclined manner to push the push rod to move relative to the gun body and having a first end formed with a locking hole for slidably receiving the push rod therethrough;

an adjusting seat movably mounted in the gun body and having a side formed with a tapered urging face rested on a first side of the first end of the push plate;

a driving member rotatably mounted on the gun body and connected to the adjusting seat for moving the adjusting seat relative to the push plate; and an elastic member mounted on the push rod between the gun body and a second side of the first end of the push plate for biasing the first end of the push plate against the adjusting seat.

2. The caulking gun in accordance with claim 1, wherein the first side of the first end of the push plate is formed with a tapered guide portion rested on the urging face of the adjusting seat.

3. The caulking gun in accordance with claim 2, wherein the guide portion of the push plate is an inclined face.

4. The caulking gun in accordance with claim 2, wherein the guide portion of the push plate is a chamfered face.

5. The caulking gun in accordance with claim 1, wherein the adjusting seat has an upper portion formed with a screw bore, and the driving member has a first end formed with a threaded rod screwed into the screw bore of the adjusting seat.

6. The caulking gun in accordance with claim 5, wherein the driving member has a second end formed with an enlarged head protruding outward from the gun body.

7. The caulking gun in accordance with claim 1, wherein the driving member has an upper end located outside of an upper portion of the gun body.

8. The caulking gun in accordance with claim 7, wherein the driving member is extended through the upper portion of the gun body.

9. The caulking gun in accordance with claim 1, wherein the driving member is an adjusting bolt.

10. The caulking gun in accordance with claim 1, wherein the gun body has an upper portion formed with a through hole to allow passage of the driving member.

11. The caulking gun in accordance with claim 1, wherein when the driving member is rotated on the gun body, the adjusting seat is limited by an inner wall of the gun body and the push plate, so that the adjusting seat cannot be rotated by the driving member.

12. The caulking gun in accordance with claim 1, wherein the adjusting seat is movable upward and downward in the gun body by rotation of the driving member.

13. The caulking gun in accordance with claim 1, further comprising a retaining member secured in the gun body and snapped onto the driving member to prevent the driving member from detaching from the gun body.

14. The caulking gun in accordance with claim 13, wherein the retaining member is a C-shaped snap ring.

15. The caulking gun in accordance with claim 13, wherein the retaining member is snapped onto a mediate portion of the driving member.

16. The caulking gun in accordance with claim 1, wherein the adjusting seat is substantially U-shaped.

17. The caulking gun in accordance with claim 1, wherein the adjusting seat is movable in the gun body by rotation of the driving member to adjust the incline angle of the push plate by guidance of the tapered urging face of the adjusting seat so as to increase the incline angle of the locking hole of the push plate.

18. The caulking gun in accordance with claim 1, further comprising a trigger pivotally mounted on the gun body and having an end provided with a push lever rested on a second end of the push plate to push the push plate to move toward the elastic member.

19. The caulking gun in accordance with claim 1, wherein the locking hole of the push plate has a circular shape.

20. The caulking gun in accordance with claim 1, wherein the locking hole of the push plate has a diameter greater than that of the push rod.

* * * * *